United States Patent [19]

Wellendorf

[11] Patent Number: 4,590,515
[45] Date of Patent: May 20, 1986

[54] METHOD AND APPARATUS FOR MODIFYING COLOR REDUCTION DEPENDING ON TONE

[75] Inventor: Klaus Wellendorf, Kitzeberg, Fed. Rep. of Germany

[73] Assignee: Dr.-Ing. Rudolf Hell GmbH, Fed. Rep. of Germany

[21] Appl. No.: 494,460

[22] Filed: May 13, 1983

[30] Foreign Application Priority Data

May 29, 1982 [EP] European Pat. Off. ........ 82104745.3

[51] Int. Cl.$^4$ ............................................. H04N 1/46
[52] U.S. Cl. ........................................ 358/75; 358/80
[58] Field of Search ................................... 358/75–80

[56] References Cited

U.S. PATENT DOCUMENTS

| | | | |
|---|---|---|---|
| 2,807,660 | 9/1957 | Rose | 178/5.4 |
| 2,981,792 | 4/1961 | Farber | 178/5.2 |
| 3,885,244 | 5/1975 | Keller | 358/80 |
| 4,346,402 | 8/1982 | Pugsley | 358/80 |
| 4,468,692 | 8/1984 | Yamada | 358/80 |
| 4,482,917 | 11/1984 | Gaulke | 358/80 |

FOREIGN PATENT DOCUMENTS 1541554 3/1979 United Kingdom .

OTHER PUBLICATIONS

Fogra-Research Report 1.203, 1981, pp. 2-26.

Primary Examiner—Michael A. Masinick
Attorney, Agent, or Firm—Hill, Van Santen, Steadman & Simpson

[57] ABSTRACT

A four color printing system wherein tone dependent color reduction is to be utilized and the color components for the chromatic printing inks yellow (Y), magenta (M) and cyan (C) are reduced and the amount of black printing ink (K) is increased so as to compensate for the reduction in the chromatic printing inks wherein a nearly total achromatic synthesis is utilized to a gray tone value which corresponds to the full tone of the black printing ink utilized. The color components of the color printing inks are then from this tone value increased from this gray tone up to the greatest image depth. So as to avoid breaks or steps in the light tone area, the color components of the chromatic printing inks are also increased in a subtonal area, particularly in the light tone area wherein reproductions can be made with or without gray tone balance.

10 Claims, 8 Drawing Figures

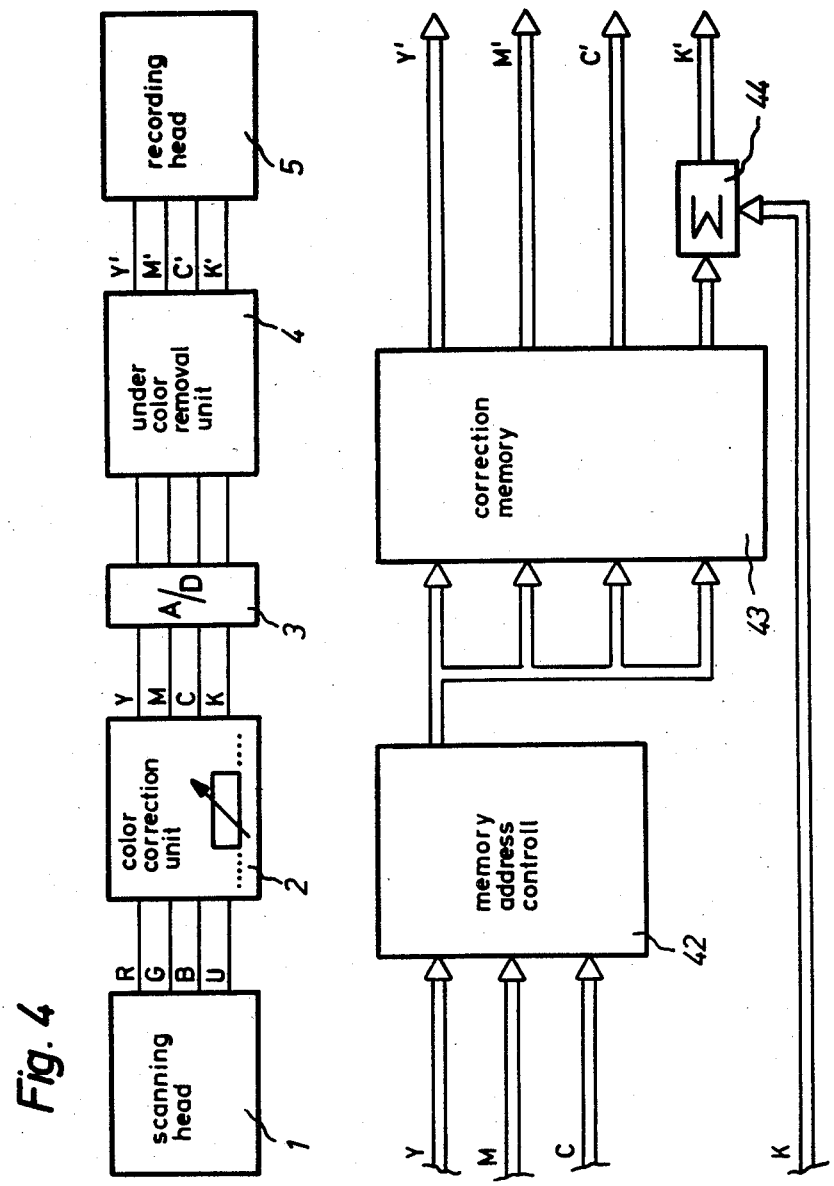

METHOD AND APPARATUS FOR MODIFYING COLOR REDUCTION DEPENDING ON TONE

BACKGROUND OF THE INVENTION

1. Field of the Invention

The present invention relates in general to a modified color reduction system for four color printing which depends on the tonal value where the color components of the chromatic printing inks yellow (Y), magenta (M) and cyan (C) are reduced and the amount of black printing ink (K) is increased so as to compensate for the decrease in the chromatic printing inks.

2. Prior Art

The article entitled "FOGRA-Forschungsbericht 1.203, Untersuchungen zur Veränderung des Farbsatzaufbaus durch geänderte Farbauszuge für Teilfarbe Schwarz" by Gunter Otschik, page 4, right-hand column, Chapter 3.1, discloses how it is possible to work with total chromatic synthesis of printing in color reduction in four color printing with an intensive black, in other words, an intensive but expensive printing ink "black". Total achromatic synthesis of printing inks means in reproduction technology that printing is accomplished with "black" in the reproduction of gray tone values and in the extremely dark tones or tints and, in other words, there are no chromatic color components contained and printed in the color separations yellow, magenta and cyan at these image gray tone values and in the extremely dark tones.

Normally cheaper printing inks for the color black are utilized and this results, however, in a gray cast occurring when 100% black is printed. For this reason, the color separations of the chromatic printing inks are not reduced to zero at these tonal values but rather a residue of chromatic color which gives rise to a higher density is printed over the entire tonal tint range in gray tones up to the deepest black (shadow) with the residual values decreasing progressively toward lighter tones and tints.

Thus, there is a danger that color casts will occur in the reproduction of gray tones over the entire tonal or tint range when fluctuations occur in the equilibrium of the chromatic printing inks Y, M and C, and this can easily occur during the printing process as is pointed out in the previously referenced citation FOGRA-Forschungsbericht, pages 3 and 4, Chapters 1 and 2.

Another disadvantage as compared to complete color reduction is that in case the gray tones are reproduced by chromatic components, a higher ink consumption of the chromatic inks occurs then when one works and uses an intense black ink.

So as to achieve a reliable gray balance using a small amount of ink for the chromatic components, a color reduction depending on the tonal values has previously been proposed for four color printing and this is described in the European patent application No. 82103090.5 which corresponds to the copending U.S. patent application Ser. No. 479,733. In this patent application, the color components of the chromatic printing inks yellow (Y), magenta (M) and cyan (C) are reduced and the amount of the black printing ink (K) is increased to compensate for this reduction and a nearly total achromatic synthesis of printing is used up to a gray tone value which corresponds to the full tone or tint of the black printing ink employed and the color components of the chromatic printing inks are then increased from this gray tone value toward the darkest shadow of the image.

Very good results can be obtained with this method but it turns out that there are instances in which so called breaks or steps occur in the light tonal range of the image. An example of such breaks occur in the reproduction of pastel shades or tones as, for example, in the magenta range when a transition to a gray tone value occurs in such color area. When total achromatic synthesis of printing is used, magenta, but less magenta, is printed in the magenta-colored area, but no magenta is present in the gray area so that formation of a contour line or a jump of the tonal value, which is not present in the original image, occurs. This results in a disruptive effect when the reproduction is viewed by an observer.

SUMMARY OF THE INVENTION

It is an object of the present invention to provide a method to eliminate these undesirable affects of the prior art where high color reduction occurs and to improve the image quality.

A feature of the invention is to reduce the chromatic printing inks yellow, magenta and cyan and to increase the black ink to compensate for this reduction and where nearly total achromatic synthesis of printing is utilized up to a gray tone value which corresponds to the full tone of the black printing ink and wherein the color components of the chromatic printing inks increase from this gray tone value up to the darkest shadow of the image and wherein the color components of the chromatic printing inks are increased in a lower tonal area, preferably in the light area.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which:

BRIEF DESCRIPTION OF THE DRAWINGS

FIG. 2b is an enlarged portion of FIG. 2a;

FIG. 3b is an enlarged portion of the curve of FIG. 3a;

FIG. 4 is a block diagram illustrating the invention; and

FIG. 5 is a block diagram illustrating the reduction color unit of FIG. 4.

DESCRIPTION OF THE PREFERRED EMBODIMENTS

Figure 1:
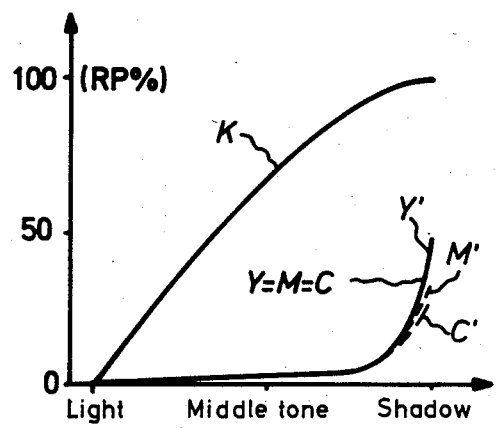
FIG. 1 is a plot of the color separation signals showing tone dependent color reduction with or without gray balance.

FIG. 1 comprises a plot of the color separation signals with the abscissa axis indicating the tonal range from light tone, middle tone to complete depth or shadow and the ordinate comprising 0 to 100 raster dot sizes.

The curve labelled Y=M=C represents the path of the color separation signals of the chromatic colors yellow, magenta and cyan as derived with color reduction in conjunction with the color separation signal for the color black, which is indicated by the curve labelled K.

As can be seen from FIG. 1, the total achromatic synthesis of printing is retained as long a possible for the reproduction of the gray tone values toward the deeper tones, for example, up to a gray tone value which corresponds to the full tone of the black printing ink employed. After this gray tone value is exceeded, the color components of the chromatic printing inks Y, M & C increase again to the full tone up to a value which either corresponds to the value which the chromatic inks would assume without color reduction for the reproduction of that particular density or up to a prescribed value which depends upon the particular printing method and the printing inks utilized. Where the curve Y=M=C illustrated in FIG. 1, the printing is carried out without gray balance, in other words, this case can be applied to printing methods where no color cast is obtained when the superimposed printing with equal components. The curves Y', M' and C' illustrate the situation where gray balance is carried out. For example, the Y' curve coincides closely with the Y=M=C curve, but the M' and C' curves are offset from the Y=M=C curve as illustrated.

Figure 2A:
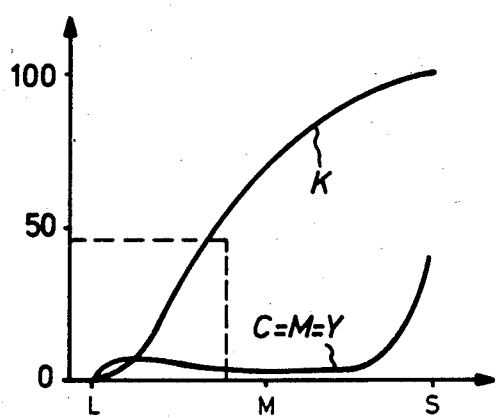
FIG. 2a is a curve showing plots of the color separation signals in the modified gray tone—dependent color reduction without gray balance.

FIG. 2a comprises a curve for the chromatic printing inks for the case in which a modified color reduction without gray balance is utilized. In this graph, the solid line curve Y=M=C is slightly higher in the lower tonal area where the density is less and also the black printing ink curve K has a decreased value in this lower range since the chromatic printing inks Y, M and C already supply black component in this range. Note the downwardly curved portion of the curve K and the upwardly curved portion of the C=M=Y curve at the lower tonal values.

The tonal values at the lower tonal range where the chromatic colors or inks are increased and where the black color or ink is reduced depends on the image or the respective printing method being utilized.

Figure 2B:
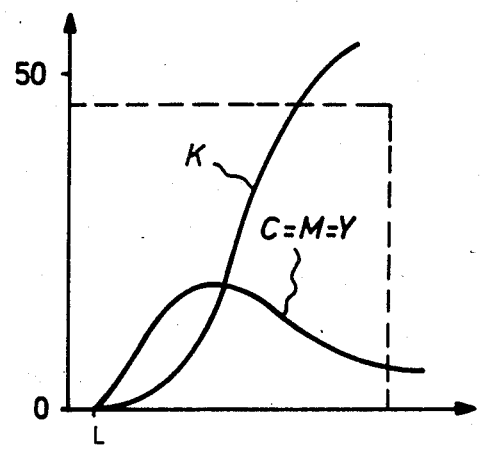

So as to illustrate the curve in the lower or light tonal areas more clearly, an enlarged portion of FIG. 2a is illustrated in FIG. 2b. This area corresponds to that portion enclosed in dash line in FIG. 2a. It can be observed that the reduction in the amount of the black printing ink results from the compensation due to the increase of the chromatic printing inks Y, M and C.

Figure 3A:
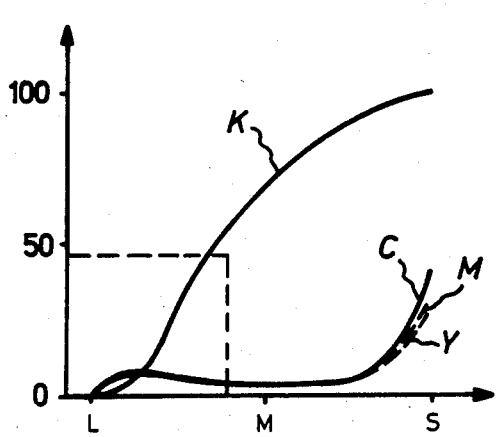
FIG. 3a is a curve illustrating a plot of the color separation signals using modified gray tone dependent color reduction with gray balance.

FIG. 3a comprises a part of a curve similar to that of FIG. 2a but with gray balance, in other words, with different amounts of the respective chromatic colors or inks are printed in dark neutral tones in order to compensate the color casts which are conditioned by the respective printing method and are the printing inks employed.

Figure 3B:
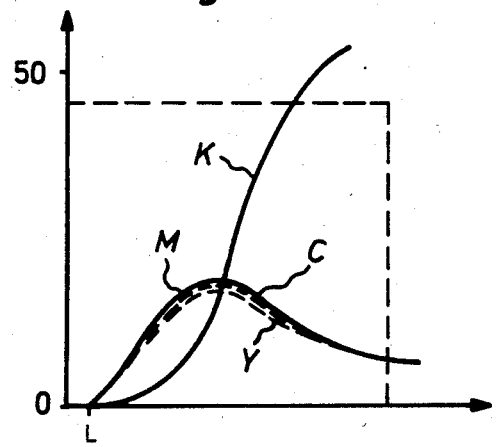

FIG. 3b comprises an enlarged plot of the dash lined portion from FIG. 3a and illustrates how the increase of the amount of chromatic inks and the decrease in the amount of black ink occurs in the lower tonal range.

Due to the increase of the chromatic ink colors in the dark neutral tone, the chromatic printing ink C is increased relative to the printing ink M and the printing ink M is increased relative to the printing ink Y in the enlarged area illustrated in FIG. 3b. A different sequence for the increase or reduction of the individual inks can also occur depending on the particular master and the particular printing method being utilized.

It is interesting to note that the sum of the ordinates of the K curve and the C=M and Y curves in FIGS. 2a, 2b, 3a and 3b results in the total amount of ink which would approximate the blank ink curve K in FIG. 1 but that in the lower tonal range the chromatic inks Y=M=C are increased and the black ink is accordingly reduced.

FIG. 4 comprises a block diagram of the apparatus for performing the method of the invention and accomplishing the color reduction. A scanning head 1 scans a master and supplies the primary measured color value signals R (red), G (green) and B (blue) as well as a surround field signal U which is utilized for electronic unsharp masking. The measured color value signals are supplied to a color correction computer or unit 2, such as disclosed in U.S. Pat. No. 3,885,244, which issued on May 20, 1975, in which the inventor is Hans Keller and which is assigned to the assignee of the present invention. The disclosure of U.S. Pat. No. 3,885,244 is hereby incorporated by reference. The output of the color correction unit 2 comprises the signals yellow (Y), magenta (M), cyan (C), and black (K). These are supplied through an analog to digital converter 3 which converts the analog signals to digital signals and supplies an output to an undercolor removal or color reduction unit 4. The reduction unit 4 is illustrated in FIG. 5 and converts the Y, M, C and K signals, which are printing ink signals, to modified printing ink signals Y', M', C' and K'. Unit 4 comprises a memory means which has stored therein the various characteristic of the respective color correction so as to convert the signals into modified printing ink signals. A recording head 5 receives the output of the reduction unit 4 and records using the modified printing ink signals. The circuit illustrated in FIG. 4 uses a simplified version of the scanner shown in FIG. 4 of U.S. Pat. No. 3,885,244.

FIG. 5 illustrates the undercolor removal unit or color reduction circuit 4 and the printing ink signals Y, M and C are supplied to a memory address control 42 where said signals are converted into input addresses for the correction memory 43. For example, an analog to digital conversion is accomplished with eight bits. For this example, the four more significant bits are employed for addressing the correction memory 43. The output signals of the correction memory 43 comprise the printing ink signals Y', M' and C', which are modified according to the color correction and are then furnished to the recording head 5 as illustrated in FIG. 4. The output corrected signal for black derived in the correction memory 43 is supplied to an adder 44 which also receives its input the black printing ink signal K which is the output of the analog to digital converter 3. The composite black signal K' is the sum of the non-corrected black printing ink signal K and the black output signal from the correction memory 43. The modified signal K' appears at the output of the adder 44. The conversion memory 43 may be, for example, a plurality of look up tables or may also be an addressable memory with a corresponding plurality of memory locations. The memory 43 may be of the type illustrated in FIG. 1b.

Figure 1B:
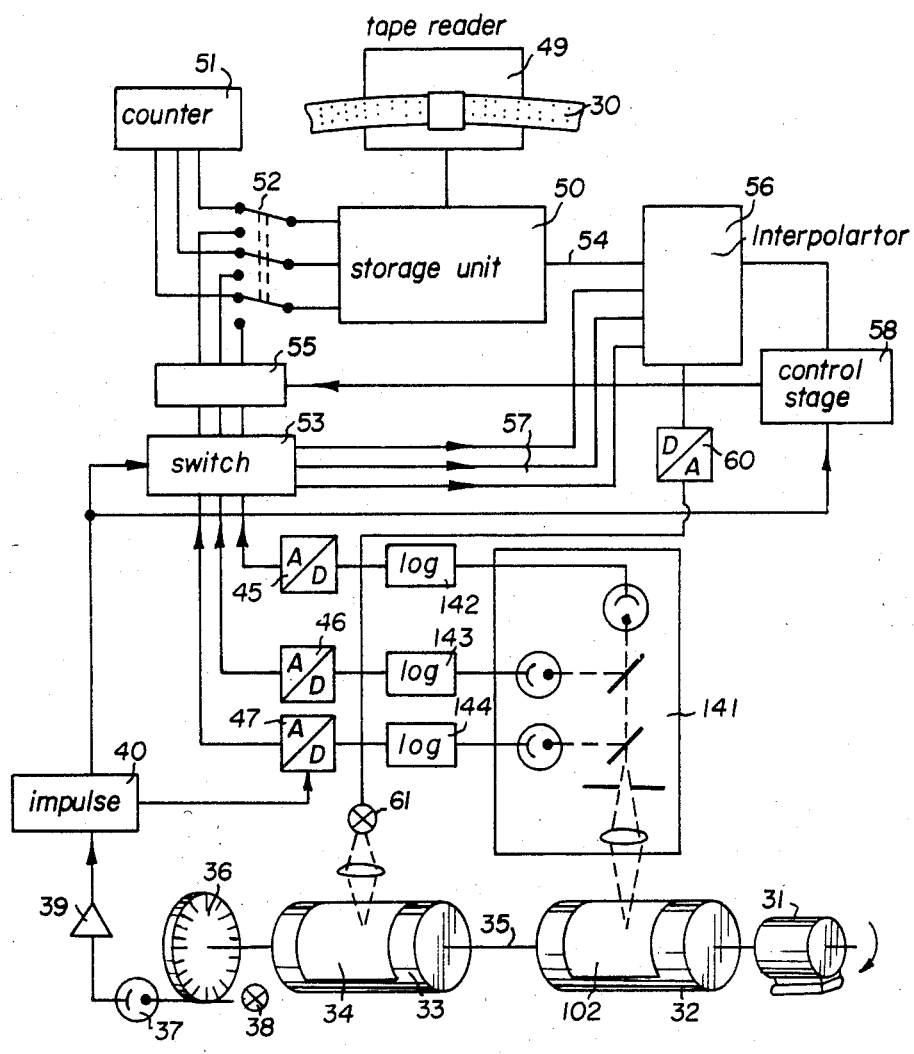
FIG. 1b is a block diagram of apparatus with reference to which the method of the invention will be explained.

FIG. 1b shows a reproducing unit. It consists of a scanning drum 32, driven by a motor 31, to hold the original 102 and of a reproduction drum 33 on which the colour separations 34 are traced out. On a common shaft 35 is mounted a known screening disc 36 which supplies synchronized timing pulses to a timer 40 via light-beam device 37, 38 and an amplifier 39.

While the scanning drum 32 is rotating, the scanning unit 141 associated with the scanning drum 32, the spectral sensitivity of which should be the same as that of scanning unit delivers the three primary signals R, G, B for the colour values which are measured. These signals are fed, via logarithmic converters 142, 143 and 144 to analogue/digital converters which are controlled by timer 40. In these they are converted into digital signals which correspond to the gradations of tonal value. Thus, uncorrected digital signals for the colour values measured become available at the outputs of analogue/digital converters 45, 46 and 47.

The correcting process proper now takes place as follows:

The punched tape 30, which contains correcting data for the whole of the colour space, is now read by means of a punched-tape reader 49 and fed into the digital correcting store 50. So that the correlation between addresses and information, i.e. between graduations of tonal value and the actual tonal value, is the same as it was when the punched tape was being produced, a counter 51 runs in synchronization with the tape and its outputs supply a suitable timing signal to the address inputs of store 50 via a switch 52. After the corrected colour-proportion values have been fed in, switch 52 is changed over so that the correcting operation may take place and is switched to the picture signal derived from the scanning of the original.

In the embodiment of FIG. 1b, the store 50 contains a framework of discrete colour-proportion values for the individual colour separations, and intermediate values are found by the known mathematical expedient of interpolation. The items of data supplied by analogue/digital converters 45, 46 and 47 may for example each consist of an 8-bit combination. The three highest value bits are split off in a separating stage 53 and switched to store 50, the remaining 5 bits being needed for interpolation. The colour-proportion value which corresponds to the particular infed value in question then appears at output 54.

To obtain the colour-proportion values which mark out the areas surrounding the points defined by the three values R, G, B in the colour space, there is provided an address raising unit 55 which is able to raise the addresses of the three part addresses, each of 3 bits, by "1". In this way eight different addresses can be applied to the store and a total of eight values appear at output 54 of store 50. In the three-dimensional colour space this provides the corner points of a cube, which points surround the actual point to be reproduced. The actual colour-proportion value is calculated in interpolation stage 56 by linear interpolation. For this purpose the five lowest value bits are fed via lines 57 to interpolator 56. These represent the distances between the value to be reproduced and the corners of the cube formed by the eight correcting values.

Since the interpolation has to take place at a faster rate than that at which points are successively scanned on the original, a timing signal multiplier is connected to timer 40, this multiplier being part of a control unit 58 for the interpolation process. The results of interpolation are fed to a digital/analogue converter 60 which controls the reproduction unit 61 and reproduces the appropriate colour separation 34 on the drum 32.

The punched paper tape illustrated in British Pat. No. 1,541,554 contains correcting data for the whole of the color space and is read by means of a punched tape reader and fed into a digital correcting store. So that the correlation between the addresses and information, in other words, between graduation of the tonal value and the actual tonal value, is the same as it was when the punched tape was being produced, a counter runs in synchronism with the tape and its output supply a suitable timing signal to the address inputs of the storage means through a switch. After the corrected color proportion values have been fed in, the switch is changed over so that the correcting operation can take place and a switch to the picture signal derived from the scanning of the original.

The store contains a framework of discreet color proporation values for the individual color separations and intermediate values are found by the known mathematical expedient of interpolation. The data supplied by the analog to digital converter may, for example, each consist of eight bit combinations. The three highest value bits are split off in a separating stage and switched to the store and the remaining five bits can be used for interpolation. The color proporational value which corresponds to particular value fed in appears at the output of the memory 43.

The output of the memory may provide eight values and in the three dimensional space this provides the corner points of a cube which points surround the actual point to be reproduced. The actual color proportional value is calculated by linear interpolation. The interpolation takes place at a faster rate than that at which points are successively scanned on the original.

Although this invention has been described with respect to preferred embodiments, it is not to be so limited as changes and modifications may be made which are within the full intended scope as defined by the appended claims.

I claim as my invention:

1. A method of tone-dependent color reduction in four-color printing, whereby the color components of the chromatic printing inks yellow (Y), magenta (M) and cyan (C) are reduced and the amount of black (K) printing ink is increased to compensate for such reduction, and a nearly achromatic synthesis of printing is employed from a light tone area to a dark tone area which corresponds to the full tone of the black printing ink employed, and the color components of the chromatic printing inks rise from this gray tone value up to the shadow characterized in that, in order to avoid breaks or steps in the light tone area, the color components of the chromatic printing inks Y, M and C are boosted in the light tone area.

2. A method according to claim 1 wherein gray balance is not utilized.

3. A method according to claim 1 wherein gray balance is utilized.

4. A method according to claim 1 wherein the amount of black ink (K) is reduced in said light or highlight area.

5. A method of tone-dependent color reduction from a light tone area to a dark tone area in four color printing comprising the steps of scanning an original to obtain primary color value signals red (R), green (G), blue (B) and a surround field signal (U), converting said R, G, B and U signals to yellow (Y), magenta (M), cyan (C) and black (K) printing ink color signals, converting said Y, M, C and K color signals to modified Y', M', C' and K' printing ink color signals wherein said Y', M' and C' signals are increased over normal values in the light or highlights area and the signal K' is decreased from normal in the light or highlight area, and producing a color copy with said modified Y', M', C' and K' printing signals.

6. Apparatus for tone-dependent color reduction from a light tone area to a dark tone area in four color printing comprising, scanning means for scanning an original and producing primary value color signals red (R), green (G), blue (B) and a surround field signal (U), a color correcting means receiving the outputs of said scanning means and producing yellow (Y), magenta (M), cyan (C) and black (K) printing ink color signals, color reduction means receiving the output of said color correcting means and producing modified Y', M' and C' and K' printing ink signals wherein said Y', M' and C' signals are increased relative to said Y, M and C signals in the light areas and the K' signal is decreased relative to the K signal in said light areas, and a recording means receiving said Y', M', C' and K' signals from said color reduction means.

7. Apparatus according to claim 6 including correction data supplied to said color reduction means.

8. Apparatus according to claim 7 wherein said color reduction means comprises a memory address control which receives said Y, M and C signals from said color correction means and a correction memory which receives inputs from said memory address control and said correction data and produces said Y', M', and C' signals.

9. Apparatus according to claim 8 including an adder which receives said K signal from said color correction means and a signal from said correction memory means to produce said modified black (K') printing ink signal.

10. Apparatus according to claim 6 including an analog to digital converter between said color correction means and said color reduction means.

* * * * *